June 5, 1956  F. H. KAYLER  2,749,144
FIFTH WHEEL STABILIZER
Filed July 19, 1952  2 Sheets-Sheet 1

INVENTOR.
Frank H. Kayler
BY
O. B. Garner

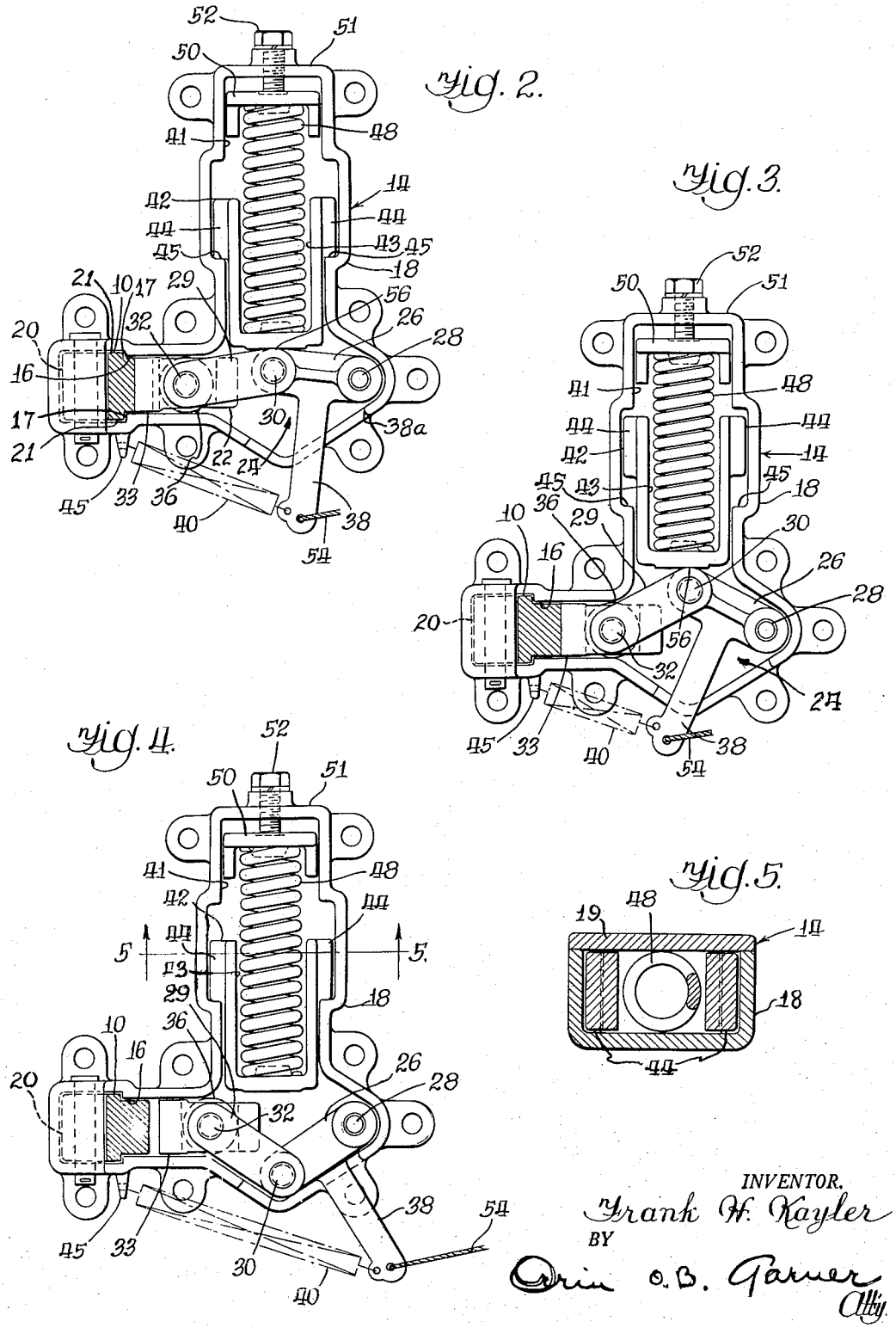

United States Patent Office 2,749,144
Patented June 5, 1956

2,749,144

FIFTH WHEEL STABILIZER

Frank H. Kayler, Alliance, Ohio, assignor to American Steel Foundries, Chicago, Ill., a corporation of New Jersey Application July 19, 1952, Serial No. 299,873

10 Claims. (Cl. 280—438)

My invention relates to fifth wheel assemblies utilized with tractor-trailer vehicle combinations and more particularly to a novel stabilizing device associated therewith.

In many conventional fifth wheel designs a wheel plate is pivotally attached or mounted on an associated tractor on an axis extending transversely thereof, thus providing for free tilting of the plate and consequent articulation between the tractor and towed trailer. The wheel plate is generally about 3 feet in diameter thus presenting a substantial surface area in engagement with the underside of the trailer. This construction may be illustrated by the patent to E. P. Kinne, No. 2,459,772, issued January 18, 1949. When the combined vehicle is in normal position, that is, with the tractor and trailer in line, the axis of tilt of the wheel plate is substantially normal to the longitudinal axis of the trailer. The mentioned area of engagement together with the perpendicular relation of the axes combine to resist objectionable side tilting of the trailer. However, as the tractor and trailer take up relatively angular positions, the angle between the axis of tilt of the wheel plate and the longitudinal axis of the trailer is gradually diminished and a parallel relation is achieved as the tractor strikes a 90 degree angle with the trailer. As this axial angular relation diminishes the lateral stability of the trailer also diminishes and approaches a condition of minimum lateral stability as the mentioned parallel relation is reached. This objectionable feature is frequently encountered when the combined vehicle is negotiating sharp curves or when the vehicle is being parked.

It is a general object of my invention to provide a novel stabilizing device associated with the fifth wheel to overcome the objectionable lack of lateral stability.

It is a further object of my invention to provide a stabilizing device of the type described of simple construction, hence of inexpensive manufacture and installation.

It is another object of my invention to provide a stabilizing device of the type described that is relatively compact and does not interfere with present construction of tractor axle and frame members.

It is a more specific object of my invention to provide a ratchet-type stabilizing device that will resist normal off-center loads but will yield to excessive forces thus preventing damage to the fifth wheel and trailer assembly.

Other objects and advantages of the invention will become apparent in the course of the following description and from an examination of the concerned drawings, wherein:

Figure 2 is a fragmentary top view with the cover plate removed of the stabilizing device taken approximately along line 2—2 as shown in Figure 1;

Figure 3 is a fragmentary top view with the cover removed of the stabilizing device when yielding to excessive loads;

Figure 4 is a top plan view with the cover removed of the stabilizing device in inoperative position, and Figure 5 is a sectional view taken along the line 5—5 of Figure 4.

Figure 1:
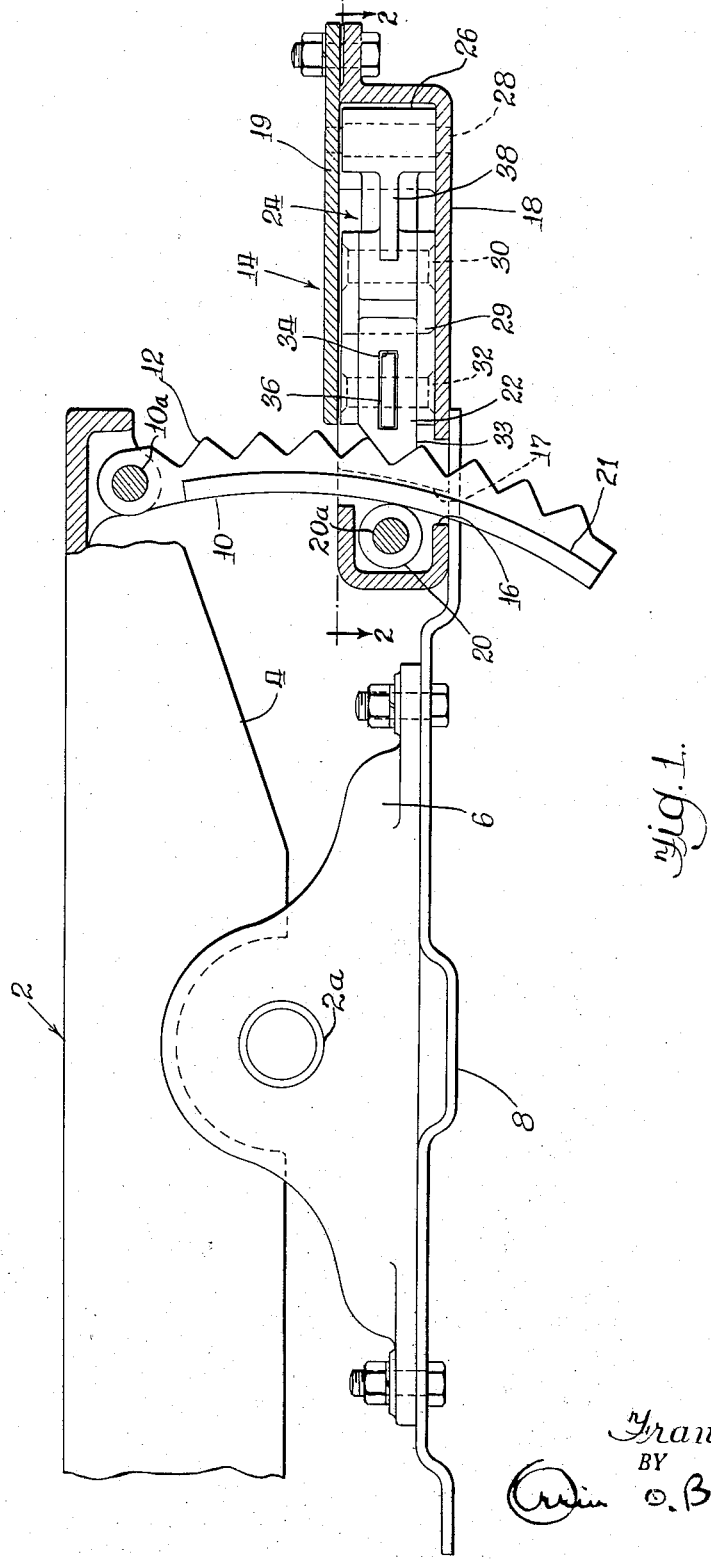
Figure 1 is a fragmentary sectional side view of an embodiment of my invention with the stabilizing device in locked position.

In various views certain structural details have been omitted to clarify presentation of the embodiment of the invention.

Describing the invention in detail, the fifth wheel, generally designated 2, comprises a wheel plate 4 pivotally mounted on brackets 6 so that the axis of pivot 2a extends transversely of an associated tractor (not shown). The brackets 6 (only one of which is shown) may be securely fastened to a mounting plate 8 and disposed on opposite sides of the frame of the mentioned tractor.

On the outer periphery of the wheel plate 4 and preferably at a point falling within the vertical longitudinal center plane of said plate, a depending rack 10 may be pivotally attached as at 10a. The rack 10 is formed on a segmental arc having its center preferably lying approximately on the axis of pivot 2a of the wheel plate. Gear teeth or ratchet teeth 12 are formed on the rack to face outboardly of the wheel plate 4.

As best seen in Figure 1, the stabilizing device, indicated generally at 14 and secured to the tractor frame in any suitable manner, presents the hole or aperture 16 through the housing 18 to movably receive the rack 10. A roller 20 is pivotally pinned to the housing 18 as at 20a and engages the rearwardly arcuate face of the rack 10 thus offering support for the rack under the action hereinafter described and concurrently facilitating movement of the rack through the housing. It should be noted that the aperture 16 of the housing 18 also presents abutments 17 adjacent the ledges 21 of the rack 10 thereby confining the rack between said abutments and said roller 20.

Referring now to Figure 2 it will be noted that the housing 18 comprises a reversed L-shaped casting having a cover plate 19 bolted thereto (Figure 1). The lower portion or channel of the reversed L in addition to receiving the above mentioned rack also houses and guides a lock or pawl 22 and a toggle actuating mechanism 24. The toggle actuating mechanism 24 consists of a primary link 26 having a pivotal pin or fulcrumed connection as at 28 to the housing 18 and cover plate 19. An articulated or floating pivotal connection is provided between the other end of the primary link 26 and one end of a secondary link 29 as at 30. The secondary link in turn comprises a pair of vertically spaced plates (Figure 1) receiving intermediate said plates at one end the primary link 26 and at the other end the lock or pawl 22. As mentioned, the lock or pawl 22 is disposed intermediate the spaced plates of the secondary link 29 whereas said plates and lock present vertically aligned pin holes providing for pivotal pin connection therebetween as at 32. In addition the lock 22 presents the horizontally disposed slot 34 (Figure 1) communicating with the mentioned vertical pin hole and providing for pivotal mounting of the roller 36 on the mentioned pivotal pin connection 32. The horizontally disposed roller 36 extends laterally slightly beyond the opposite edges of the lock 22 thus facilitating movement of the lock in the housing by intermittent rolling engagement with the side walls thereof. In addition the lock 22 presents a tooth or lug portion 33 formed to complementally engage the ratchet teeth 12 of the rack 10.

An operating arm 38 may be rigidly secured to the primary link 26 and disposed to extend outboardly of the housing 18 through a suitable clearance slot 38a in the side thereof. At a point adjacent the outboard extremity of the arm 38 a tension spring 40 is anchored thereto. The other end of the spring 40 is fastened to a lug 45 on the housing 18 preferably at a point adjacent the foot of the reversed L. When assembled the spring 40 is under tension so as to present a force urging the arm 38 to move in a clockwise direction as seen in any of the plan views.

It is to be noted that the floating pivotal connection 30 between the primary link 26 and the secondary link 29 is disposed in the area of intercommunication of the channels of the reversed L-shaped housing 18. In the locked position as seen in Figure 2, the links 26 and 29 abut a striker casting 42. The casting 42 is disposed within the upper channel 41 of the housing and comprises stop lugs 44 extending from opposite sides thereof to engage abutments 45, 45 in the walls of the housing 18 thus limiting linear movement of the casting within the housing. The casting 42 also presents a hollow or recess 43 centrally thereof to receive and seat one end of a coiled spring 48. The opposite end of the spring 48 abuts a movable spring seat 50 disposed within the channel 41 adjacent the end wall 51 of the housing 18. A spring loading screw 52 is disposed centrally of the end wall 51 and extends therethrough and is in threaded engagement therewith. Within the channel 41 the load screw 52 engages the movable spring seat 50 and provides means to vary the compressive load of the spring 48.

It should also be noted that the arm 38 has connected thereto a cable 54 (Figure 4) at a point adjacent the outboard end of said arm. Desirably the cable terminates in the cab of the tractor and offers means to enable the tractor operator to manually disengage or release the stabilizing device.

To describe the operation of the stabilizing device reference is made to Figure 4 wherein the device is illustrated in its released position. The tension spring 40 urges the actuating arm 38 in a clockwise direction moving the toggle actuating mechanism 24 over center and into engagement with the striking casting as shown at 56 in Figure 3. As the mechanism moves over center the pawl or lock 22 is urged to move linearly toward and into engagement with the complementally formed teeth on the rack 10. The stabilizing device is now in the locked position of Figure 2 and the interengaged rack and lock resist tilting of the wheel plate 4 on its pivotal axis.

As the force urging the wheel plate to tilt becomes excessive the pressure transmitted from the rack 10 through the lock 22 to the striker casting 42 gradually overcomes the pressure exerted by the load spring 48. The spring 48 is urged to compress allowing the toggle mechanism to jackknife or collapse thereby disengaging the pawl or lock from the rack and accommodating a tilting action of the wheel plate. This action is illustrated in Figure 3 and it should be noted that the pressure point at which the mechanism will slip directly depends upon the compressive force preset in the load spring 48 by the spring loading screw 52.

The cable 54 offers manual means whereby the arm 38 may be rotated in a counterclockwise direction thus urging the linkage mechanism to collapse in the direction opposed to that above described. This action disengages the pawl from the rack when use of the stabilizing device is not desired.

I claim:

1. In a fifth wheel arrangement, a frame member, a wheel plate member pivotally mounted on said frame member for movement about a horizontal axis, a rack pivotally connected to and depending downwardly from one end of said wheel plate member, teeth provided on said rack, a locking device comprising a housing secured to said frame member and having an opening to slidably receive the rack, a pawl mounted in said housing for reciprocative movement transversely of said rack and having a wedge-shaped end normally engaged between two adjacent teeth on said rack to resist pivotal movement of said wheel plate member about said axis, toggle linkage comprising one link pivotally connected to said pawl, another link pivotally connected to said housing and having a pivotal connection to said one link, said last mentioned connection affording a floating pivotal connection movable transversely through the projected line of travel of said pawl to move the pawl into and out of engagement with the rack teeth, resilient compressible means mounted in said housing and normally engaging said floating pivotal connection to yieldably resist movement of said pawl away from said rack responsive to pivotal movement of said wheel plate, a manual operating arm provided on one of said links to move said floating pivotal connection away from said compressible means and to move said pawl out of engagement with said rack teeth, and a tension means interconnecting said operating arm and housing to urge said floating pivotal connection into engagement with said compressible member.

2. A fifth wheel arrangement according to claim 1, in which said tension means comprises a coiled spring normally under tension.

3. A fifth wheel arrangement according to claim 1, including means on said housing in engagement with and operable to vary the force exerted by said compressible means against said floating pivotal connection in resisting movement of said pawl away from said rack.

4. A fifth wheel arrangement according to claim 1, in which said compressible means comprises a striker casting mounted for reciprocative movement in said housing along a plane angularly disposed to the line of travel of said pawl for engagement with said floating pivotal connection, a spring seat mounted in said housing, a resilient compressible member interposed between said striker casting and spring seat, abutment means on said housing to engage and limit forward movement of said striker casting toward said toggle linkage.

5. A fifth wheel arrangement according to claim 4, including an adjustment screw on said housing to vary the spacing between said striker casting and spring seat to vary the loading of the compressible member.

6. In a fifth wheel arrangement, a frame member, a wheel plate member tiltably carried thereby, a stabilizer interconnecting said members and comprising a vertically disposed toothed rack pivotally carried by one of said members, a locking device carried by the other of said members and embracing said rack, said device comprising a housing and a locking element guided for reciprocative movement therein into and out of engagement with said rack, a toggle mechanism directly and operatively interconnecting said housing to said element, spring means on said housing to urge the toggle to collapse in one direction whereby the locking element is urged to engage the rack, and resilient compressible means in said housing engageable with said mechanism upon a predetermined collapse thereof in said one direction whereby disengagement of said locking element and said rack is resiliently resisted.

7. In a stabilizing device for resisting relative movement between pivotally interconnected parts of a fifth wheel arrangement, a vertically disposed toothed rack pivotally connected to one of said parts, a locking mechanism connected to the other of said parts and comprising a housing embracing said rack, said mechanism comprising a pawl movable through said housing into and out of detent-lock engagement with said rack, actuating linkage interconnecting said housing and said pawl for moving the pawl and consisting of a link having a direct pivotal connection to the pawl, another link having a fixed pivotal connection to said housing, a direct articulated connection between said links, spring means on said housing to move said articulated connection in one direction, and limitedly movable means in said housing normally engaging and yieldably resisting movement of said articulated connection in said one direction to yieldably resist movement of said pawl relative to said rack.

8. In a fifth wheel arrangement, a frame member, a wheel plate member connected thereto and pivotally movable thereon, a vertically disposed rack pivotally connected at one end thereof to one of said members, a locking device connected to the other of said members and comprising a housing having an opening receiving the rack, a pawl disposed within the housing and guided thereby for linear movement into and out of engagement with said rack, a toggle linkage interconnecting said pawl and housing comprising one link having a pivotal connection to the pawl, another link having a pivotal connection to the housing, a pivot pin connecting the links to each other providing an articulated connection movable transversely of the projected line of travel of said pawl, pressure means on said housing normally urging said articulated connection in one direction to engage said pawl with said rack, and other limitedly movable pressure means in said housing engageable with said links upon movement of said articulated connection a predetermined distance in said one direction whereby said other pressure means yieldably resists further movement of said articulated connection in said one direction and resultant movement of said pawl away from said rack, and manually operated means connected to one of said links whereby said articulated connection may be moved in a direction opposite the mentioned direction to move said pawl out of engagement with said rack.

9. A stabilizing device according to claim 7, wherein said limitedly movable means comprises a striker casting guided for reciprocative movement in said housing and normally engaging said linkage, and a compressed spring mounted in said housing and engaging said casting.

10. A stabilizing device according to claim 9, including adjustable means in said housing engaging said spring and movable toward and away from said casting to vary the compressive loading of the spring.

References Cited in the file of this patent

UNITED STATES PATENTS

| | | |
|---|---|---|
| 471,764 | Steffey | Mar. 29, 1892 |
| 834,097 | Wray | Oct. 23, 1906 |
| 1,120,169 | Tabor | Dec. 8, 1914 |
| 1,238,042 | Moore | Aug. 21, 1917 |
| 1,295,680 | Benson | Feb. 25, 1919 |
| 2,066,430 | Swift | Jan. 5, 1937 |
| 2,084,291 | Ranger | June 15, 1937 |
| 2,153,819 | Van Voorhees | Apr. 11, 1939 |
| 2,293,402 | Parsons | Aug. 18, 1942 |
| 2,320,278 | Johnston | May 25, 1943 |
| 2,369,725 | Dyrr | Feb. 20, 1945 |
| 2,528,076 | Plaxco | Oct. 31, 1950 |
| 2,602,674 | Harris | July 8, 1952 |
| 2,612,381 | Johnson | Sept. 30, 1952 |
| 2,663,587 | Woodhams | Dec. 22, 1953 |